3,387,047
ALKENYLCYCLOBUTENES AND METHOD
OF PREPARING SAME
Vittorio Turba, Milan, Italy, Guido Sartori, Roselle, N.J., and Alberto Valvassori, Milan, Italy, assignors to Montecatini Edison S.p.A., Milan, Italy
No Drawing. Filed Apr. 17, 1967, Ser. No. 631,150
Claims priority, application Italy, Apr. 22, 1966, 9,312/66; Oct. 26, 1966, 29,296/66
9 Claims. (Cl. 260—666)

ABSTRACT OF THE DISCLOSURE

Alkenylcyclobutenes of the following formulas:

(I) 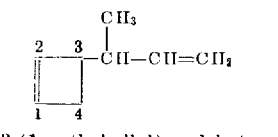

3-(1-methyl-allyl)-cyclobutene (II) 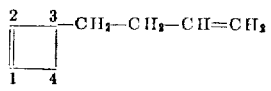

3-(3-butenyl)-cyclobutene (III) 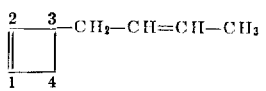

3-(trans-2-butenyl)-cyclobutene prepared by subjecting butadiene dimers to ultraviolet light radiation. To obtain compound I, initial butadiene dimer is 3-methyl-1,4,6-heptatriene; for compound II, initial dimer is 1,3,7-octatriene; for compound III, initial dimer is 1,3,6-octatriene.

BACKGROUND OF THE INVENTION

1. Field of the invention

The present invention relates to alkenylcyclobutenes and to a method for their preparation.

2. Description of the prior art

From the literature was known to obtain cyclobutene compounds by irradiation of substances containing a system of conjugated double bonds. R. Srinivasan (J.A.C.S. 84, 4141 (1962)) described the preparation of 1-methylcyclobutene, 1,2-dimethyl-cyclobutene and 3-methyl-cyclobutene from isoprene, 2,3-dimethyl-butadiene and pentadiene-1,3. K. J. Crowley (Proc. Chem. Soc., 1962, 334) describes the preparation of 1-(3-isohexenyl)cyclobutene and J. L. Charlton and P. de Mayo (Tetrah. Letters, 1965; 4679) describe the preparation of 1-(2-propenyl)cyclobutene.

In U.S. patent application 534,424, 1960 the preparation of 3-methyl-4-(4-pentenyl)cyclobutene and of 3-(5-hexenyl)cyclobutene is described.

SUMMARY OF THE INVENTION

The present invention relates to the following alkenylcyclobutenes:

(I) 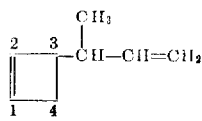

3-(1-methyl-allyl)-cyclobutene (II) 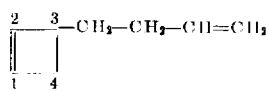

3-(3-butenyl)-cyclobutene (III) 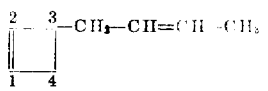

3-(trans-2-butenyl)-cyclobutene

The preparation of the foregoing alkenylcyclobutenes is carried out using butadiene dimers and subjecting such dimers to irradiation with ultraviolet light.

DESCRIPTION OF THE PREFERRED EMBODIMENTS

For the preparation of compound I, the starting butadiene dimer is 3-methyl-1,4,6-heptatriene. For compound II, the initial butadiene dimer is 1,3,7-octatriene. For compound III, the starting butadiene dimer is 1,3,6-octatriene.

The starting triene is isomerized by irradiation with ultraviolet light at a temperature of from about 10° C. to 50° C., a preferred temperature being about room temperature. As a radiation source, quartz mercury vapor lamps are desirably employed.

The reaction is desirably carried out in glass apparatus of the immersion type, which allows a high exploitation of the emitted radiations. The duration of the irradiation will depend upon the power of the lamp, the amount of triene to be irradiated, and the desired degree of conversion.

The reaction may be carried out under an inert gas atmosphere, in liquid media wherein the triene is in solution. Inert solvents such as liquid hydrocarbons (alkanes, cycloalkanes) and ethers are preferred. Those solvents which have boiling points below 100° C. and hence which are more easily separated, are preferred. The obtained compound is separated from the reaction crude by distillation.

The products may be used in the preparation of various derivatives, such as, e.g., to prepare carbonyl compounds by ozonization. They are also useful for preparing terpolymers with ethylene and propylene, from which elastomers may be obtained by vulcanization, as by using organic hydroperoxides.

The following examples will further illustrate the present invention. The Examples 4, 5 and 6 illustrate the preparation of terpolymers from the monomers of the present invention.

Example 1

In a cylindrical three-necked, 5 liter reactor, provided with a reflux condenser, maintained under nitrogen atmosphere, 4000 cc. of n-pentane and 75 g. of 3-methyl-1,4,6-heptatriene were introduced. In the middle neck of the reactor a low pressure quartz mercury vapour lamp (Hanau, NN 30/89, 30 W) was placed.

The reactor was immersed in a cylindrical vessel wherein tap water was circulated. At the bottom of the reactor a small nitrogen stream was introduced at intervals in order to mix the solution. After 400 hours the irradiation was interrupted (conversion of 55%).

The pentane was removed by distillation. The residue showed product 1 to be present in an amount of 22% (weight percent by gas chromatographic analysis). By rectification under vacuum, product 1 was separated from the residue. In the pure state, product 1 showed the following: B.P. 42–42.5° C./68–70 mm. Hg; $n_D^{20}$: 1.4366. Analysis of the carbon-hydrogen content of product 1 gave the following results.

Theoretical for $C_8H_{12}$, C, 88.82; H, 11.18. Found: C, 88.94; H, 11.06.

The infrared spectrum of the product showed the following characteristics bands: 1636 cm.$^{-1}$ (stretching C=C of vinyl); 990 cm.$^{-1}$ (deformation out of the plane of CH of vinyl); 908 cm.$^{-1}$ (deformation out of the plane of $CH_2$ of the vinyl); 1560 cm.$^{-1}$ (stretching C=C in a cyclobutene ring); 659 cm.$^{-1}$ (deformation out of the plane of the hydrogen atoms adjacent to a cis double bond); 1370 cm.$^{-1}$ (symmetrical deformation of the methyl).

On the basis of the foregoing results the structure of 3-(1-methyl-allyl)-cyclobutene has to be attributed to compound I. This structure is confirmed by the nuclear magnetic resonance spectrum.

Example 2

In a cylindrical, three-necked reactor provided with water cooling and maintained under a nitrogen atmosphere, there were introduced 4000 cc. of anhydrous ether, free of peroxides, and 75 g. of 1,3,7-octatriene.

In the middle neck of the reactor a low pressure mercury vapor quartz lamp (Hanau, NN 30/89, 30 W) was placed. The reactor was immersed in a cylindrical vessel wherein running water was circulated. After 450 hours the irradiation was interrupted (conversion=92% of the 1,3,7-octatriene).

The ether was removed by distillation. Gas-chromatographic analysis showed the residue to be made up of 77% of product II and 8% of 1,3,7-octatriene. From the residue product II was obtained in the pure state by rectification, and showed the following: B.P. 41° C./44 mm. Hg; $n_D^{20}$=1.4406. Analysis of the carbon-hydrogen content of product II gave the following results:

Theoretical for $C_8H_{12}$, C, 88.82%; H, 11.18%. Found: C, 88.93%; H, 11.09%.

The infrared spectrum showed the following characteristic bands: 1635 cm.$^{-1}$ (stretching C=C of the vinyl); 993 cm.$^{-1}$ (deformation out of the plane of CH of the vinyl); 910 cm.$^{-1}$ (deformation out of the plane of $CH_2$ of the vinyl); 1560 cm.$^{-1}$ (stretching C=C in a cyclobutene ring); 700 cm.$^{-1}$ (deformation out of the plane of the hydrogen atoms adjacent to a cis double bond in the ring). On the basis of the results obtained, the structure of 3-(3-butenyl)-cyclobutene has to be attributed to compound II.

Example 3

In a cylindrical three necked reactor, provided with water cooling and maintained under a nitrogen atmosphere, 4 liters of anhydrous ether and 47 g. of 1,3,6-octatriene were introduced. In the middle neck of the reactor, a low pressure mercury vapor lamp (Hanau, model NN 30/89, 30 W) was introduced. The reactor was immersed in a cylindrical vessel wherein running water was circulated.

After 400 hours the irradiation was interrupted. The solution was distilled to remove the ether. The residue, analyzed by gas-chromatography, was shown to contain 41.5% of product III. From the residue, by preparative gas-chromatography, there was separated the pure product III. Its chemico-physical characterstics were as follows: B.P. 47.5–48° C./52 mm. Hg; $n_D^{20}$=1.4461; M.W.=108 (from mass spectrography).

Infrared analysis showed the presence of bands characteristics of the cis double bond in a cyclobutene ring (3120 cm.$^{-1}$, 1563 cm.$^{-1}$, and 960 cm.$^{-1}$); of the trans double bond (965 cm.$^{-1}$); and of the methyl group (1377 cm.$^{-1}$). On the basis of these results the structure of 3-(trans-2-butenyl)-cyclobutene has to be attributed to product III.

Example 4

The reaction apparatus consists of a glass cylinder having 5.5 cm. diameter and 700 cc. capacity, equipped with agitator and gas inlet and outlet tubes. The gas inlet tube reaches the bottom of the apparatus and ends in a porous baffle (3.5 cm. diameter).

200 cc. of anhydrous n-heptane and 1 cc. of 3-(1-methyl-allyl)-cyclobutene are introduced into the apparatus which is kept at the constant temperature of −20° C.

Through the gas inlet tube a propylene-ethylene mixture having molecular ratio of 2:1 is introduced and circulated at the rate of 450 Nl./h. The catalyst is preformed in a 100 cc. flask, operating at −20° C. under nitrogen atmosphere, by reacting in 35 cc. of anhydrous n-heptane, 0.25 millimol of vanadium tetrachloride and 1.25 millimols of ethyl-aluminium sesquichloride $Al_2Et_3Cl_3$. The catalyst thus preformed is siphoned into the reactor by means of nitrogen pressure. The ethylene-propylene mixture is continuously fed and discharged at the rate of 450 Nl./h.

After 2.5 minutes from the introduction of the catalyst, the reaction is stopped by addition of 10 cc. of methanol containing 0.1 g. of phenyl-beta-naphthylamine. The product is purified by means of repeated treatments with diluted hydrochloric acid and then with water, and is coagulated in acetone.

After drying under vacuum, 4.5 g. of a product are obtained which is solid, amorphous under X-ray examination, looks like a non-vulcanized elastomer, completely soluble in boiling n-heptane.

The analysis by infrared spectrography shows the presence of vinyl groups (bands at 10 and 11 microns).

Example 5

The reaction apparatus consists of a glass cylinder having 5.5 cm. diameter and 1500 cc. capacity, equipped with agitator and gas inlet tube, dipped into a bath kept at the constant temperature of −20° C. The gas inlet tube reaches the bottom of the cylinder and ends in a porous baffle (3.5 cm. diameter). 1050 cc. of anhydrous n-heptane and 2 cc. of 3-(3-butenyl)-cyclobutene are introduced into the reactor, kept under nitrogen atmosphere. Through the gas inlet tube a gaseous propylene-ethylene mixture having molar ratio of 4:1 is introduced and circulated at the rate of 500 Nl./h.

The catalyst is preformed in a 100 cc. flask, kept at −20° C. in nitrogen atmosphere, by reacting in 40 cc. of anhydrous n-heptane, 1 millimole of vanadium tetrachloride and 2.5 millimols of ethyl-aluminium-sesquichloride $Al_2Et_3Cl_3$. The catalyst thus preformed is siphoned into the reactor by means of nitrogen pressure.

The gaseous ethylene-propylene mixture is continuously fed and discharged at the rate of 500 Nl./h.

After 3 minutes from the introduction of the catalyst, the reaction is stopped by addition of 10 cc. of methanol containing 0.1 g. of phenyl-beta-naphthylamine. The product is purified in a separating funnel and under nitrogen atmosphere, by means of repeated treatments with diluted hydrochloric acid and then with water, and is coagulated in acetone.

After drying under vacuum, 19 g. of a product are obtained which is solid, amorphous under X-ray examination, looks like a non-vulcanized elastomer, completely soluble in boiling n-heptane.

The infrared analysis shows the presence of vinyl groups (bands at 10 and 11 microns). The propylene content is 65% by weight.

100 parts by weight of terpolymer are mixed, in a laboratory roll mixer, with 50 parts of carbon black HAF, 5 parts of zinc oxide, 0.5 parts of sulphur, 1.5 parts of tetra-methyl-thiouram monosulphide, and 0.5 part of mercaptobenzothiazole. The mixture obtained is vulcanized in a press for 60 minutes at 150° C. A vulcanized lamina is obtained, having the following characteristics:

Tensile strength _____ kg./cm.$^2$ __ 175
Elongation at break _____ percent __ 500
Modulus at 200% _____ kg./cm.$^2$ __ 55
Modulus at 300% _____ kg./cm.$^2$ __ 110
Residual deformation at break _____ percent __ 12

Example 6

The reaction apparatus is a glass autoclave having 500 cc. capacity, equipped with agitator and gas feeding tube. 100 cc. of propylene and 2 cc. of 3-(trans-2-butenyl)-cyclobutene are introduced into the autoclave which is kept at the constant temperature of −20° C. Ethylene is introduced until a pressure increase of 0.7 atm. is obtained. From two separate dosing devices the components of the catalyst are introduced into the reactor, first 0.37 millimol of AlEt$_2$Cl dissolved in 1 cc. of anhydrous n-heptane and then 0.05 millimol of vanadium triacetylacetonate dissolved in 1 cc. of anhydrous toluene. During the polymerization the pressure is kept constant by recharging the absorbed ethylene.

After 7 minutes the reaction is stopped. The olefins are removed and the product, dissolved in cyclohexane, is purified in a separating funnel by means of repeated treatments with diluted hydrochloric acid, then with water, and is coagulated in acetone.

After drying under vacuum, 7.1 g. of a product are obtained which is solid, amorphous under X-ray examination, looks like a non-vulcanized elastomer, completely soluble in boiling n-heptane. The analysis by infrared spectrography shows a propylene content corresponding to 41% by weight and the presence of trans double bonds (band at 10.35 microns).

100 parts by weight of terpolymer are mixed in a laboratory roll mixer with 1 part of stearic acid, 5 parts of zinc oxide, 80 parts of carbon black ISAF, 55 parts of naphthenic oil, 0.75 part of mercaptobenzothiazole, 1.5 parts of tetra-methyl-thiouram monosulphide, and 1.5 parts of sulphur. The mixture thus obtained is vulcanized in a press at 150° C. for 60 minutes. A vulcanized lamina is obtained, having the following characteristics:

| | |
|---|---|
| Tensile strength _____kg./cm.$^2$__ | 172 |
| Elongation at break _____percent__ | 390 |
| Modulus at 200% _____kg./cm.$^2$__ | 60 |
| Modulus at 300% _____kg./cm.$^2$__ | 121 |
| Residual deformation at break _____percent__ | 8 |
| Delft D$_1$ _____do____ | 4.5 |

Variations can of course be made without departing from the spirit and scope of our invention.

Having thus described our invention, what we desire to secure and hereby claim by Letters Patent is:

1. A cyclobutene selected from the group consisting of
   (1) 3-(1-methyl-allyl)-cyclobutene, having a boiling point of about 42–42.5° C. at pressure of 68–70 mm. Hg, and having the following structure:

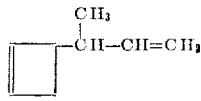

(2) 3-(3-butenyl)-cyclobutene, having a boiling point of about 41° C. at a pressure of 44 mm. Hg, and having the following structure:

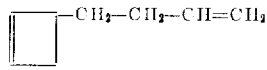

and (3) 3-(trans-2-butenyl)-cyclobutene, having a boiling point of about 47.5–48° C. at a pressure of 52 mm. Hg, and having the following structure:

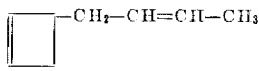

2. 3-(1-methyl-allyl)-cyclobutene as defined in claim 1.
3. 3-(3-butenyl)-cyclobutene as defined in claim 1.
4. 3-(trans-2-butenyl)-cyclobutene as defined in claim 1.
5. A method for the preparation of the cyclobutenes of claim 1 comprising irradiating an octatriene selected from the group consisting of 3-methyl-1,4,6-heptatriene, 1,3,7-octatriene, and 1,3,6-octatriene with ultraviolet light at a temperature of from about 10 to 50° C., the radiation being carried out under inert ambient conditions.
6. The method of claim 5 wherein the dimer is in solution in an inert solvent selected from the group consisting of aliphatic ethers, alkanes and cycloalkanes.
7. The method of claim 5 wherein the octatriene is 3-methyl-1,4,6-heptatriene so as to produce 3-(1-methyl-allyl)-cyclobutene.
8. The method of claim 5 wherein the octatriene is 1,3,7-octatriene so as to produce 3-(3-butenyl)-cyclobutene.
9. The method of claim 5 wherein the octatriene is 1,3,6-octatriene so as to produce 3-(trans-2-butenyl)-cyclobutene.

References Cited

UNITED STATES PATENTS 2,995,543    8/1961    Williams _____ 260—82.1

OTHER REFERENCES

George S. Hammond, et al., J. Org. Chem. 28, 3297–3303, 1963.

K. J. Crowley, Proceedings Chemical Society, 1962, pp. 334–335.

K. J. Crowley, Tetrahedron, vol. 21, pp. 1001–1014, 1965.

DELBERT E. GANTZ, *Primary Examiner.*

V. O'KEEFE, *Assistant Examiner.*